US007965719B2

(12) United States Patent
Karaoguz et al.

(10) Patent No.: US 7,965,719 B2
(45) Date of Patent: Jun. 21, 2011

(54) MEDIA EXCHANGE NETWORK SUPPORTING MULTIPLE BROADBAND NETWORK AND SERVICE PROVIDER INFRASTRUCTURES

(75) Inventors: Jeyhan Karaoguz, Irvine, CA (US); James Bennett, Laguna Beach, CA (US)

(73) Assignee: Broadcom Corporation

( * ) Notice: Subject to any disclaimer, the term of this patent is extended or adjusted under 35 U.S.C. 154(b) by 1087 days.

(21) Appl. No.: 10/675,380

(22) Filed: Sep. 30, 2003

(65) Prior Publication Data
US 2004/0114579 A1 Jun. 17, 2004

Related U.S. Application Data

(60) Provisional application No. 60/432,472, filed on Dec. 11, 2002, provisional application No. 60/443,894, filed on Jan. 30, 2003, provisional application No. 60/457,179, filed on Mar. 25, 2003, provisional application No. 60/453,788, filed on Mar. 11, 2003.

(51) Int. Cl.
*H04L 12/56* (2006.01)
(52) U.S. Cl. .................. 370/397; 370/399; 370/409
(58) Field of Classification Search .................. 370/216, 370/217, 218, 219, 220, 221, 225, 228, 35, 370/351, 395.3, 395.43, 395.53, 401, 395.32, 370/327, 397, 399, 409
See application file for complete search history.

(56) References Cited

U.S. PATENT DOCUMENTS

| | | | | |
|---|---|---|---|---|
| 5,649,091 A * | 7/1997 | Ould-Ali et al. | ................ | 714/11 |
| 6,272,107 B1 * | 8/2001 | Rochberger et al. | .......... | 370/216 |
| 6,308,205 B1 * | 10/2001 | Carcerano et al. | ............ | 709/221 |
| 6,308,328 B1 * | 10/2001 | Bowcutt et al. | ................ | 725/111 |
| 6,400,687 B1 * | 6/2002 | Davison et al. | ................ | 370/236 |
| 6,457,098 B1 * | 9/2002 | DeKoning et al. | ............ | 711/114 |
| 6,542,266 B1 * | 4/2003 | Phillips et al. | ................... | 398/54 |
| 6,678,259 B1 * | 1/2004 | Schwengler | ................... | 370/329 |
| 6,774,926 B1 | 8/2004 | Ellis et al. | | |
| 6,917,624 B1 * | 7/2005 | Gorman | ........................ | 370/430 |
| 6,970,919 B1 * | 11/2005 | Doi et al. | ........................ | 709/220 |
| 6,975,586 B1 * | 12/2005 | Yoshimura | .................... | 370/217 |
| 7,009,982 B2 * | 3/2006 | Scott et al. | ..................... | 370/401 |
| 7,639,705 B2 * | 12/2009 | Watanabe et al. | ............. | 370/419 |
| 7,848,228 B2 * | 12/2010 | Yamamoto | .................... | 370/222 |
| 7,860,015 B1 * | 12/2010 | Panelli et al. | .................. | 370/241 |

(Continued)

OTHER PUBLICATIONS

Managing Virtual Circuit and Virtual Path Services on ATM Networks with Quality of Service Guarantees; N Anerousis—1996.*

*Primary Examiner* — Salman Ahmed
(74) *Attorney, Agent, or Firm* — McAndrews, Held & Malloy, Ltd.

(57) ABSTRACT

Certain embodiments of the invention for supporting a plurality of broadband networks and service provider infrastructures may comprise establishing a second communication path that is independent of a first communication path that couples at least two end points via at least a first network. Accordingly, information may be transferred between the two endpoints via the established second communication path. The second communication path may be provisioned for handling various communication functions, for example, operations administration maintenance and provisioning (OAM&P), roaming, user authentication, media transfer, caching, storage management and addressing management. During transfer of the information between the two endpoints via the second communication path, the information may be temporarily stored or cached. The first communication path may be a physical communication path and the second communication path may be a logical communication path that may comprise one or more circuit switched connections and/ or one or more packet switched connections.

25 Claims, 12 Drawing Sheets

U.S. PATENT DOCUMENTS

| | | | |
|---|---|---|---|
| 2002/0016933 A1* | 2/2002 | Smith et al. | 714/4 |
| 2002/0016971 A1 | 2/2002 | Berezowski et al. | |
| 2002/0021659 A1* | 2/2002 | Meijen et al. | 370/217 |
| 2002/0131422 A1* | 9/2002 | Chu et al. | 370/397 |
| 2003/0043791 A1* | 3/2003 | Kato | 370/386 |
| 2003/0147352 A1* | 8/2003 | Ishibashi et al. | 370/248 |
| 2003/0226091 A1* | 12/2003 | Platenberg et al. | 714/776 |
| 2004/0003051 A1 | 1/2004 | Krzyzanowski et al. | |
| 2004/0031059 A1* | 2/2004 | Bialk et al. | 725/129 |
| 2005/0028208 A1 | 2/2005 | Ellis et al. | |
| 2005/0147029 A1* | 7/2005 | Gambardella et al. | 370/218 |
| 2006/0013149 A1* | 1/2006 | Jahn et al. | 370/254 |
| 2006/0209877 A1* | 9/2006 | Yamamoto | 370/452 |
| 2007/0011587 A1* | 1/2007 | Platenberg et al. | 714/774 |
| 2007/0083504 A1* | 4/2007 | Britt et al. | 707/5 |
| 2007/0083604 A1* | 4/2007 | Zimman et al. | 709/207 |
| 2009/0225752 A1* | 9/2009 | Mitsumori | 370/390 |
| 2010/0290385 A1* | 11/2010 | Ankaiah et al. | 370/315 |

* cited by examiner

| CHANNELS | << 1PM | 2PM | HOUR, DAY ... | 6PM | 7PM >> |
|---|---|---|---|---|---|
| Family Vacations | | | | | |
| Kids sports | | | | | |
| ... | | | | | |
| Vacation in Alaska Video 802 | Normal Estimated Delivery Time: 2 Hrs 13 mins Cost: $0.59 (Without Queuing) | | Showing All day (48 mins) Earliest Order Time: 4:00 PM MPEG-2, 1.5 Mbps | | |
| Vacation in Alaska Video 803 | Express Estimated Delivery Time: 18 mins Cost: $1.20 (With Queuing) | | Showing All day (48 mins) Earliest Order Time: 4:00 PM MPEG-2, 4 Mbps | | |
| Vacation in Alaska Video 804 | Overnight Delivery: available Next Morning Cost: $0.05 (Server Stored) | | Showing All day (48 mins) Earliest Order Time: 4:00 PM MPEG-2, 19 Mbps | | |

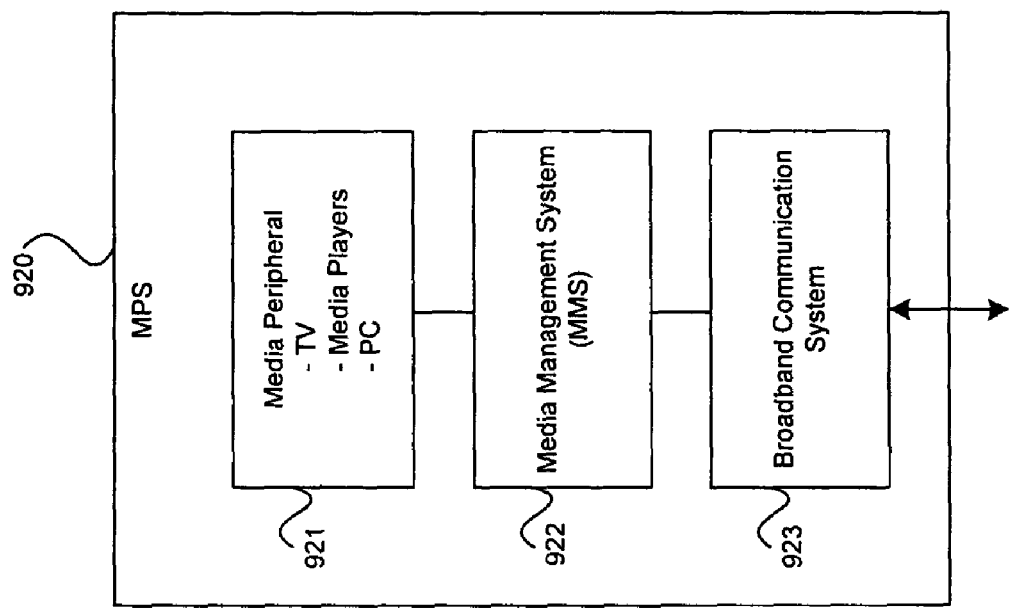

MEDIA EXCHANGE NETWORK SUPPORTING MULTIPLE BROADBAND NETWORK AND SERVICE PROVIDER INFRASTRUCTURES

CROSS-REFERENCE TO RELATED APPLICATIONS/INCORPORATION BY REFERENCE

This application makes reference to, claims priority to, and claims the benefit of:

U.S. Provisional Application Serial No. 60/432,472 filed Dec. 11, 2002;
U.S. Provisional Application Serial No. 60/443,894 filed Jan. 30, 2003;
U.S. Provisional Application Serial No. 60/457,179 filed Mar. 25, 2003; and
U.S. Provisional Application Serial No. 60/453,788 filed Mar. 11, 2003.

This application also makes reference to:
U.S. application Ser. No. 10/657,390, filed Sep. 8, 2003; and
U.S. application Ser. No. 10/660,267, filed Sep. 11, 2003.

All of the above stated applications are incorporated herein by reference in their entirety.

FIELD OF THE INVENTION

Certain embodiments of the present invention relate to broadband communication network infrastructures. In particular, certain embodiments of the present invention relate to providing a media exchange network having a common network provisioning infrastructure on top of multiple physical layer infrastructures.

BACKGROUND OF THE INVENTION

There are various types of communication services in existence today which utilize various types of physical communication infrastructures. A cable provider utilizes coaxial cable feeding servers at a cable headend. A digital subscriber line (DSL) provider uses twisted pair copper phone lines and modems in conjunction with a central office having servers. A satellite provider utilizes orbiting satellites and antenna or satellite dishes and receivers on the ground to wirelessly provide programming to users. An Internet service provider (ISP) may use existing telephone lines connected to a server via a modem. Optical fiber may be utilized to link servers and computers on a research campus. Accordingly, different physical layer protocols, supporting different bandwidths and data rates, may be utilized on the different physical communication infrastructures. For example, certain existing telephone lines and servers may support 56 Kilobits per second (56K) communications using a personal computer equipped with a 56K modem. Optical fiber lines or unshielded twisted pair type 5 (UTP-5) lines may support 1 Gigabit Ethernet communications.

The different service providers may utilize different network provisioning protocol s, provided by different software platforms, at the logical connection level. A network provisioning protocol at the logical connection level may provide various types of communication functionality including roaming, user authentication, content delivery, caching and/or storage management, and/or addressing management. However, given the vast number of physical communication infrastructures types supporting varying types of protocols, different equipment is required to support provisioning, and integration can be expensive, time consuming and difficult.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Certain embodiments of the invention may be found in a method and system for supporting a plurality of broadband networks and various service provider infrastructures. Aspects of the method may comprise establishing a second communication path that is independent of a first communication path that couples at least two end points via at least a first broadband network. Accordingly, information that would normally be transferred over the first communication path may be transferred between the two endpoints via the established second communication path and traversing the first broadband network. The second communication path may be provisioned for handling various communication functions, for example, operations administration maintenance and provisioning (OAM&P), roaming, user authentication, media transfer, caching, storage management and addressing management. During transfer of the information between the two endpoints via the established second communication path, the information may be temporarily stored or cached.

In accordance with various aspects of the invention, the first communication path may be a physical communication path and the second communication path may be a logical communication path. The second communication path may comprise one or more circuit switched connections and/or one or more packet switched connections. The first and second communication paths may include one or more wired and/or wireless links. A first of the endpoints may be a first source endpoint and second of the endpoints may be a first destination endpoint. The endpoints may be media processing systems, media peripherals, personal computers, third ($3^{rd}$) party media providers, third ($3^{rd}$) party storage vendors and/or channel information servers.

Another embodiment of the invention may provide a machine-readable storage, having stored thereon, a computer program having at least one code section for supporting a plurality of broadband networks and service provider infrastructures in a communication network. The at least one code section may be executable by a machine, thereby causing the machine to perform the steps as described above for supporting a plurality of broadband networks and service provider infrastructures in a communication network.

Certain aspects of the system for supporting a plurality of broadband networks and various service provider infrastructures may comprise at least one processor that executes a provisioning protocol, which establishes a second communication path that is independent of a first communication path that couples at least two end points via at least a first broadband network. The processor may be adapted to transfer information that would normally be transferred over the first communication path between at least two endpoints utilizing the established second communication path and traversing the first broadband network. The processor provisions the established second communication path so that it may handle various communication functions. Exemplary communication functions that may be handled by the processor may include, but are not limited to, operation administration maintenance and administration (OAM&P), roaming, user authentication, media transfer, caching, storage management and addressing management.

Information transferred between the two endpoints via the established second communication path may be temporarily stored or cached by the processor. The first communication path may be a physical communication path, while the second communication path may be a logical communication path comprising a circuit switched connection and/or a packet switched connection. The two endpoints may comprise a first source endpoint and at least a first destination endpoint. The two endpoints may comprise media processing systems, media peripherals, personal computers, third ($3^{rd}$) party media providers, third ($3^{rd}$) party storage vendors and/or channel information servers. The second and the first communication paths may comprises a wired and/or a wireless communication link. The processor may be media processing system processor, a media management system processor, a computer processor, a media exchange software processor and/or a media peripheral processor.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 8 is an exemplary illustration of a TV guide channel user interface showing several options of a pushed media in accordance with an embodiment of the present invention.

FIG. 9B illustrates an alternative embodiment of a media processing system (MPS) in accordance with various aspects of the present invention.

DETAILED DESCRIPTION OF THE INVENTION

Certain embodiments of the invention may be found in a method and system for supporting a plurality of broadband networks and service provider infrastructures. Aspects of the method may comprise establishing a second communication path that is independent of a first communication path that couples at least two end points via at least a first broadband network. Accordingly, information that would normally be transferred over the first communication path may be transferred between the two endpoints via the established second communication path and traversing the first broadband network. The second communication path may be provisioned for handling various communication functions. Exemplary communication functions that may be handled via the second communication path may include, but are not limited to, operations administration maintenance and provisioning (OAM&P), roaming, user authentication, media transfer, caching, storage management and addressing management. A first of the endpoints may operate as a first source endpoint, while a second of the endpoints may operate as a first destination endpoint. Accordingly, information may be transferred between the first source endpoint and the first destination endpoint via the second communication channel.

During transfer of the information between the two endpoints via the established second communication path, the information may be temporarily stored or cached. The first communication path may be a physical communication path and the second communication path may be a logical communication path comprising one or more circuit switched connections and/or one or more packet switched connections. The first and second communication paths may further include one or more wired and/or wireless links. The endpoints may be media processing systems, media peripherals, personal computers, third ($3^{rd}$) party media providers, third ($3^{rd}$) party storage vendors and/or channel information servers.

Figure 1:
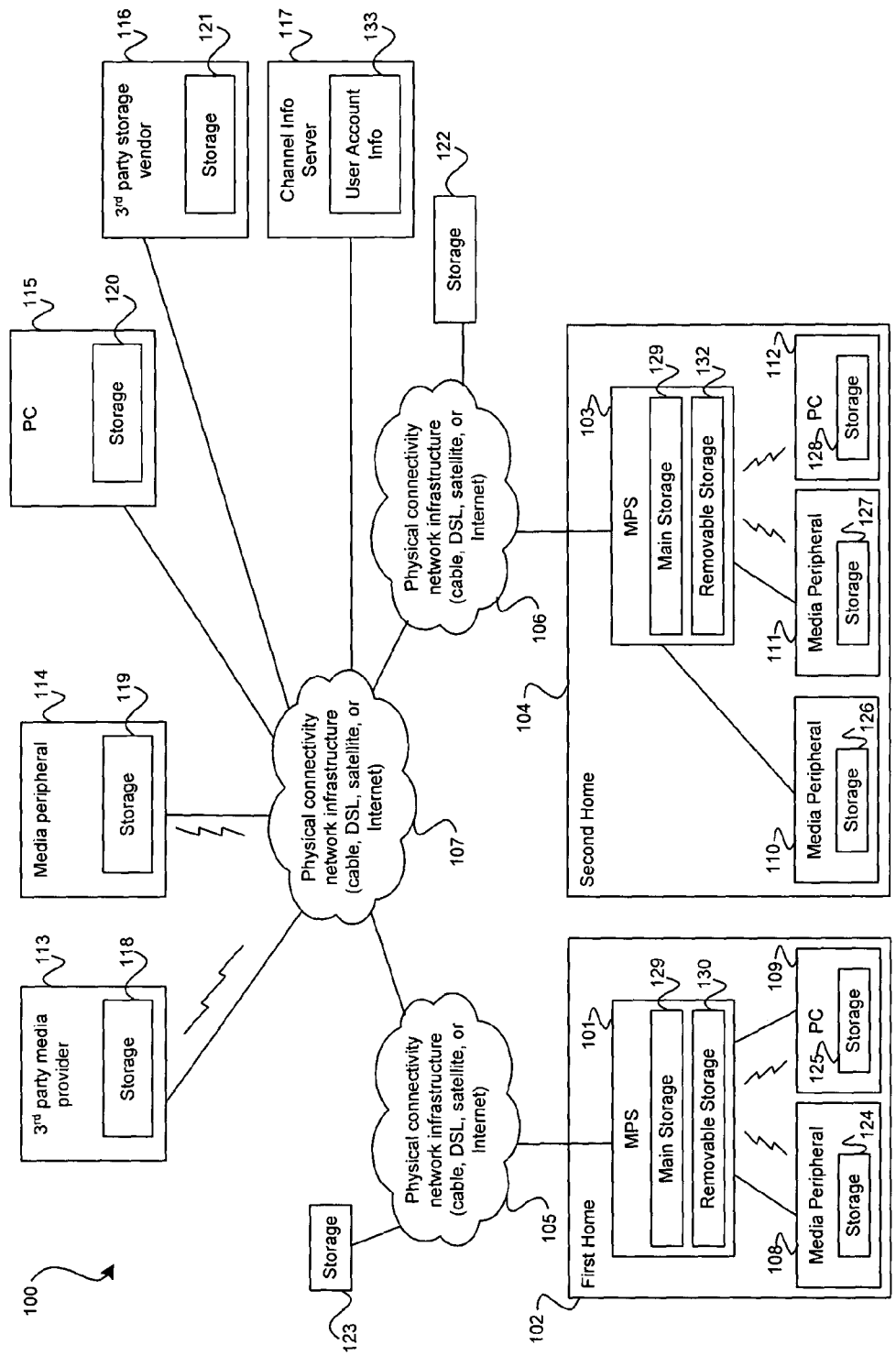
FIG. 1 is a diagram illustrating an embodiment of a media exchange network providing a common network provisioning infrastructure on top of multiple physical layer infrastructures, in accordance with various aspects of the present invention.

FIG. 1 is a diagram illustrating an embodiment of a media exchange network 100 providing a common network provisioning infrastructure on top of multiple physical layer infrastructures, in accordance with various aspects of the present invention. Referring to FIG. 1, the media exchange network 100 is a communication network comprising physical connectivity network infrastructures 105, 106, 107, a first home location 102 and a second home location 104. A storage block 123 may be coupled to the physical connectivity network infrastructures 105 and a storage block 122 is coupled to the physical connectivity network infrastructures 106. A third ($3^{rd}$) party media provider 113 and a media peripheral 114 may be coupled to the physical connectivity network infrastructure 107 via a wired and/or wireless connection. The wireless connection may be, for example, Bluetooth or any 802.11x based protocols. A media exchange network is a communication network that may be adapted to communicate or transfer media.

A personal computer 115, a third ($3^{rd}$) party storage vendor 116 and a channel information server 117 may also be coupled to the physical connectivity network infrastructures 107. Each of the third ($3^{rd}$) party media provider 113, media peripheral 114, personal computer 115 and the third ($3^{rd}$) party storage vendor 116 may include a storage block 118, 119, 120 and 121 respectively. The channel information server may include a database, for example, that may be adapted to store user account information 133.

The first home 102 may include a media processing system 101, one or more media peripherals 108 and a personal computer 109. The media processing system 101 may include a main storage 129 and a removable storage 130. The media peripheral 108 and the personal computer 109 may be coupled to the media processing system 101 in a wired and/or wireless manner. Each of the media peripherals 108 and personal computer 109 may comprise a storage block 124, 125 respectively.

The second home 104 may include a media processing system 103, a wired media peripherals block 110, a personal computer 111 and a wireless media peripherals block 112. The media processing system 101 may include a main storage 131 and a removable storage 132. The main storage locations may comprise, for example, hard disk drives, a digital versatile disc (DVD) player, a compact disc (CD) player, floppy disk drives, random access memory (RAM), or any combination of these. The removable storage locations may include, for example, memory cards, PCMCIA cards, compact flash cards, or any combination of these.

The personal computer 109 may be coupled to the media processing system 103 in a wired and/or wireless manner. The wired media peripherals block 110 may be coupled to the media processing system 103 via a wired connection and the wireless peripherals block 112 may be coupled to the media processing system 103 via a wireless connection. The wireless connection may be, for example, Bluetooth or any 802.11x based protocols. Each of the wired media peripherals block 110, personal computer 111 and wireless media peripherals block 112 may comprise a storage block 126, 127, 128 respectively.

The first media processing system 101 at the first home interfaces to the first physical connectivity network infrastructure 105, and the second media processing system 103 at the second home may interface to the second physical connectivity network infrastructure 106. Both physical connectivity network infrastructures 105 and 106 interface to the third physical connectivity network infrastructure 107.

The physical connectivity network infrastructures 105, 106, 107 may each comprise any one of a number of physical communication infrastructures including a cable infrastructure such as a cable headend, a digital subscriber line (DSL) infrastructure such as a DSL central office, a satellite infrastructure, an Internet infrastructure, a cellular infrastructure, an optical infrastructure, a dial-up to the network infrastructure, or any combination of these. The physical connectivity network infrastructures 105, 106, 107 may provide access to, for example, home, offices and/or business and may be coupled to other networks such as LANs, WANs, intranets and/or the Internet.

The media exchange network 100 may also comprise several other systems interfacing to the physical connectivity network infrastructure 107 including a third (3$^{rd}$) party media provider 113, a media peripheral 114, a personal computer 115, a third (3$^{rd}$) party storage vendor 116, and a channel info server 117.

The various physically wired connections between the various elements of the media exchange network 100 may comprise twisted pair copper connections, coaxial cable connections, optical fiber connections, telephone line connections, any other type of hard-wired connection, or any combination of these using any physical layer communication protocol. Similarly, the various wireless connections between the various elements of the media exchange network 100 may support various wireless communication protocols at various bandwidths, data rates, and transmission frequencies. With reference to FIG. 1, the physical connections are illustrated as solid lines between the various elements or components of FIG. 1.

The personal computers may comprise desktop personal computers, notebook personal computers, handheld computers, personal digital assistants, personal computer tablets, media peripherals, or any computing device.

The various media peripherals 108, 110, 112, 114 of the media exchange network 100 may include, for example, a digital camera, a digital camcorder, a MP3 player, a home juke-box system, a personal digital assistant, and a multimedia gateway device. The media processing systems 101, 102 include a television screen for viewing user guides and media content on the media exchange network. The user guides may include a media view or media guide, a device view or device guide and/or a channel view or channel guide. U.S. patent application Ser. No. 10/675,382, filed Sep. 30, 2003, and U.S. patent application Ser. No. 10/675,467 filed Sep. 30, 2003 provides exemplary media view or guide, device view or guide, and channel view or guide, and are hereby incorporated herein by reference in their entirety.

A media processing system may also comprise a set-top-box (STB), a PC, and/or a television with a media management system (MMS). A media management system may also be referred to as a media exchange software (MES) platform. Notwithstanding, a media management system may include a software platform operating on at least one processor that may provide certain functionality including user interface functionality, distributed storage functionality, networking functionality, and automatic control and monitoring of media peripheral devices. For example, a media management system may provide automatic control of media peripheral devices, automatic status monitoring of media peripheral devices, and inter-home media processing system routing selection. A media processing system may also be referred to as a media-box and/or an M-box. Any personal computer may indirectly access and/or control any media peripheral device in instances where the personal computer may include a media management system. Such access and/or control may be accomplished through various communication pathways via the media processing system or outside of the media processing system. A media processing system may also have the capability to automatically access and control any media peripheral device without user interaction and/or with user intervention. A personal computer (PC) may include media exchange software running on or being executed by the personal computer and may be referred to as a media processing system. The media processing system may also include a speech recognition engine that may be adapted to receive input speech and utilize the input speech to control various functions of the media processing system.

Each of the elements or components of the network for communicating media or media exchange network may be identified by a network protocol address or other identifier which may include, but is not limited to, an Internet protocol (IP) address, a media access control (MAC) address and an electronic serial number (ESN). Examples of elements or components that may be identified by such addresses or identifiers may include media processing systems, media management systems, personal computers, media or content providers, media exchange software platforms and media peripherals.

Figure 2:
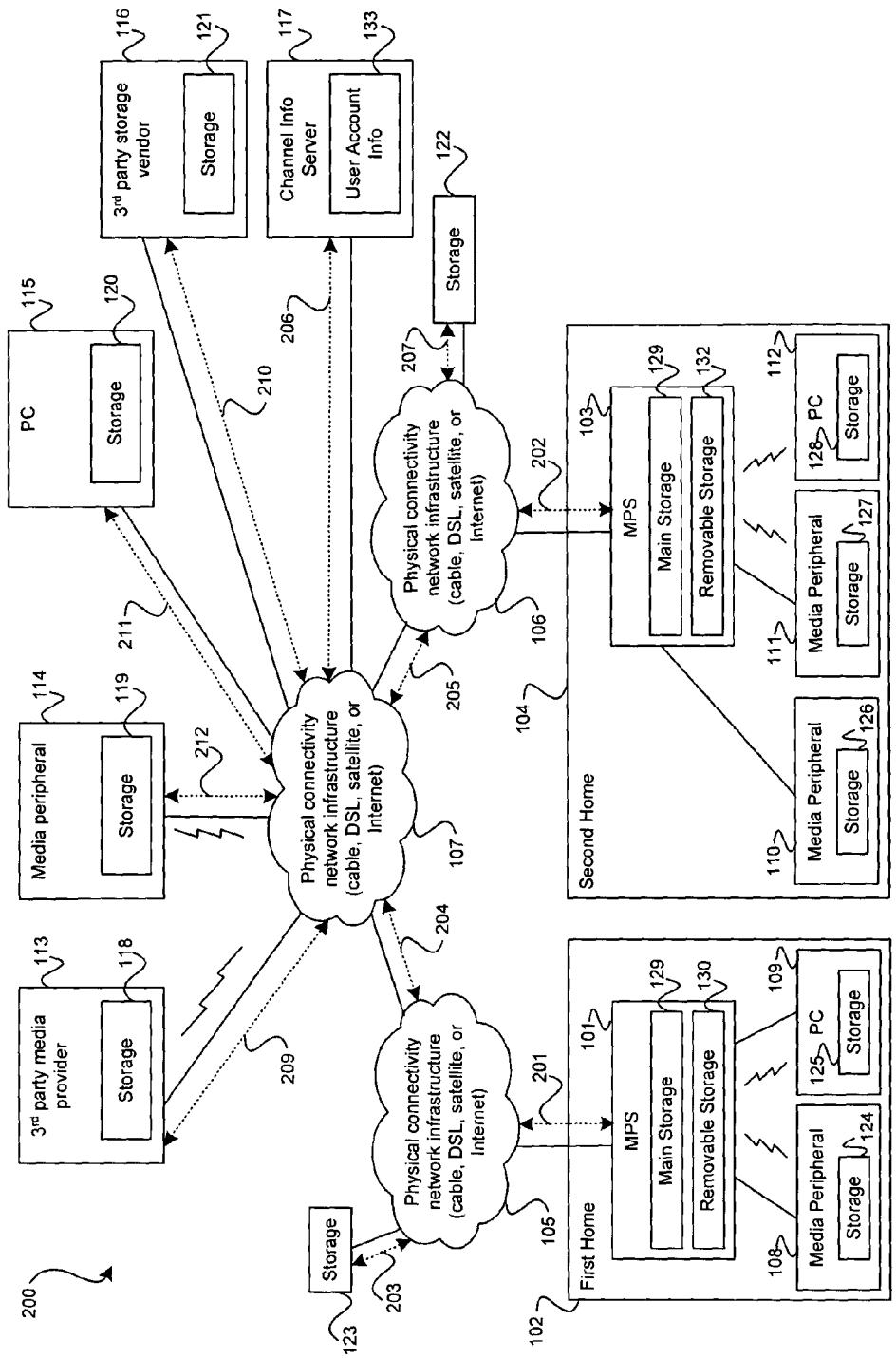
FIG. 2 is a diagram illustrating an embodiment of communication flow in the media exchange network of FIG. 1 using a common network provisioning infrastructure, in accordance with various aspects of the present invention.

FIG. 2 is a diagram illustrating an embodiment of communication flow in the media exchange network 100 of FIG. 1 using a common network provisioning infrastructure, in accordance with various aspects of the present invention. Referring to FIG. 2, there is shown the common network provisioning infrastructure similar to that of FIG. 1, but having various logical level communication pathways. In this regard, the physical network connections between the various elements of the media exchange network 100 are shown as solid lines and the additional logical level communication pathways provided by the common network provisioning protocol are illustrated as corresponding dashed lines having double-ended arrows.

In accordance with an embodiment of the invention, a network provisioning protocol at the logical connection level may be adapted to provide various types of communication functionality including operations administration maintenance and provisioning (OAM&P), roaming, user authentication, media content and delivery, caching and storage management, and addressing management. With regard to the communication network or media exchange network 100 of FIGS. 1 and 2, the network provisioning protocol may be common throughout the media exchange network 100, even though the physical connectivity network infrastructure may be different at various points in the media exchange network 100. In an aspect of the invention, the common network provisioning protocol may be provided by various software platforms that operate on top of or overlays the physical network infrastructure. These software platforms may include suitable software and/or hardware that may be adapted to provide exemplary functions such as operations administration maintenance and provisioning (OAM&P), roaming, user authentication, media content and delivery, caching and storage management, and addressing management.

In an illustrative embodiment of the invention, referring to FIG. 2, a user of the media processing system 101 at the first home 102 may request certain music to be downloaded from the third ($3^{rd}$) party media provider 113. A logical connection may be established between the media processing system 101 and the third ($3^{rd}$) party media provider 113. The request may be transmitted from the media processing system 101 over the logical communication pathway 201, which may be physically provided as a coaxial cable, to the physical connectivity network infrastructure 105, which may comprise a cable headend. The request is then transmitted over the communication pathway 204, which may be physically comprise a twisted pair of copper wires, to the physical connectivity network 107, which may comprise a DSL office. Finally, the request may be transmitted over the communication pathway 209, which may be physically provided as a wireless link, to the $3^{rd}$ party media provider 113, which may comprise a CD jukebox storing CD music as MP3 files. The requested music is then downloaded in the form of, for example, MP3 files to the media processing system 101 over the same communication pathways, however, in the opposite direction. The transmitting of the request and the downloading of the MP3 files may be provided by, for example, a software platform residing on the media processing system 101 and third ($3^{rd}$) party media provider 113. The software platform provides the common network provisioning protocol that establishes the logical connection between the processing system 101 and the third ($3^{rd}$) party media provider 113, independent of the type of physical communication pathway between the two.

In another illustrative embodiment of the invention, a user of the personal computer 115 may currently be storing many personal digital video files in the storage location 120. Accordingly, the user may have a desire to free up some storage space in the storage location 120 by storing the digital video files at the third ($3^{rd}$) party storage vendor 116 rather that within the storage 120 of personal computer 115. A logical connection may be established between the personal computer 115 and the third ($3^{rd}$) party storage vendor 116. The user of the personal computer 115 may push or otherwise communicate the digital video files over the communication pathway 211, which may be physically provided by a circuit switched connection such as a telephone line connection, to the physical connectivity network infrastructure 107, which may comprise the Internet. The digital video files may then traverse the Internet and may be pushed or otherwise communicated over the communication pathway 210, which may also be physically provided as telephone lines, to the third ($3^{rd}$) party storage vendor 116 where they are stored in the storage location 121. The pushing or otherwise communicating of the digital video files may be provided by, for example, a software platform residing on the personal computer 115. The software platform may provide the common network provisioning protocol that establishes the logical connection between the personal computer 115 and the third ($3^{rd}$) party storage vendor 116, independent of the type of physical communication pathway between the two.

In a further illustrative embodiment of the invention, the media processing system 103 at the second home 104 may request permission to download digital pictures from the media peripheral 108 at the first home 102. A logical connection may be established between the media processing system 103 and the media processing system 101, independent of the type of physical communication pathway existing between the media processing systems 101, 103. The request for permission may be transmitted over the communication pathway 202, which is physically provided as a twisted pair of copper wires, from the media processing system 103 to the physical connectivity network infrastructure 106, which may comprise a DSL central office. The request is then transmitted over the communication pathway 205, which is physically provided as telephone lines or a circuit switched connection, to the physical connectivity network infrastructure 107, which comprises the Internet. The request may then be transmitted over the communication pathway 204, which may physically be a coaxial cable, to the physical connectivity infrastructure 105, which comprises a cable headend. Finally, the request is transmitted over the communication pathway 201, which may physically be a coaxial cable, to the media processing system 101. The media processing system 101 may respond to the request by granting authorization to the user of the media processing system 103 to access digital pictures stored on the media peripheral 108, which may comprise a digital camera. The transmitting of the request may be provided by, for example, a software platform residing on the media processing system 103. The software platform provides the common network provisioning protocol that establishes the logical connection between the media processing system 103 and the media processing system 101, independent of the type of physical communication pathway between the two.

The common network provisioning protocol may facilitate establishment of other possible communication pathways on the media exchange network 100, in accordance with various embodiments of the invention. Alternatively, other embodiments of the media exchange network may also be realized, comprising other combinations of network elements such as, media management systems, media processing systems, and personal computers and using the common network provisioning protocol and infrastructure.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a media guide user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
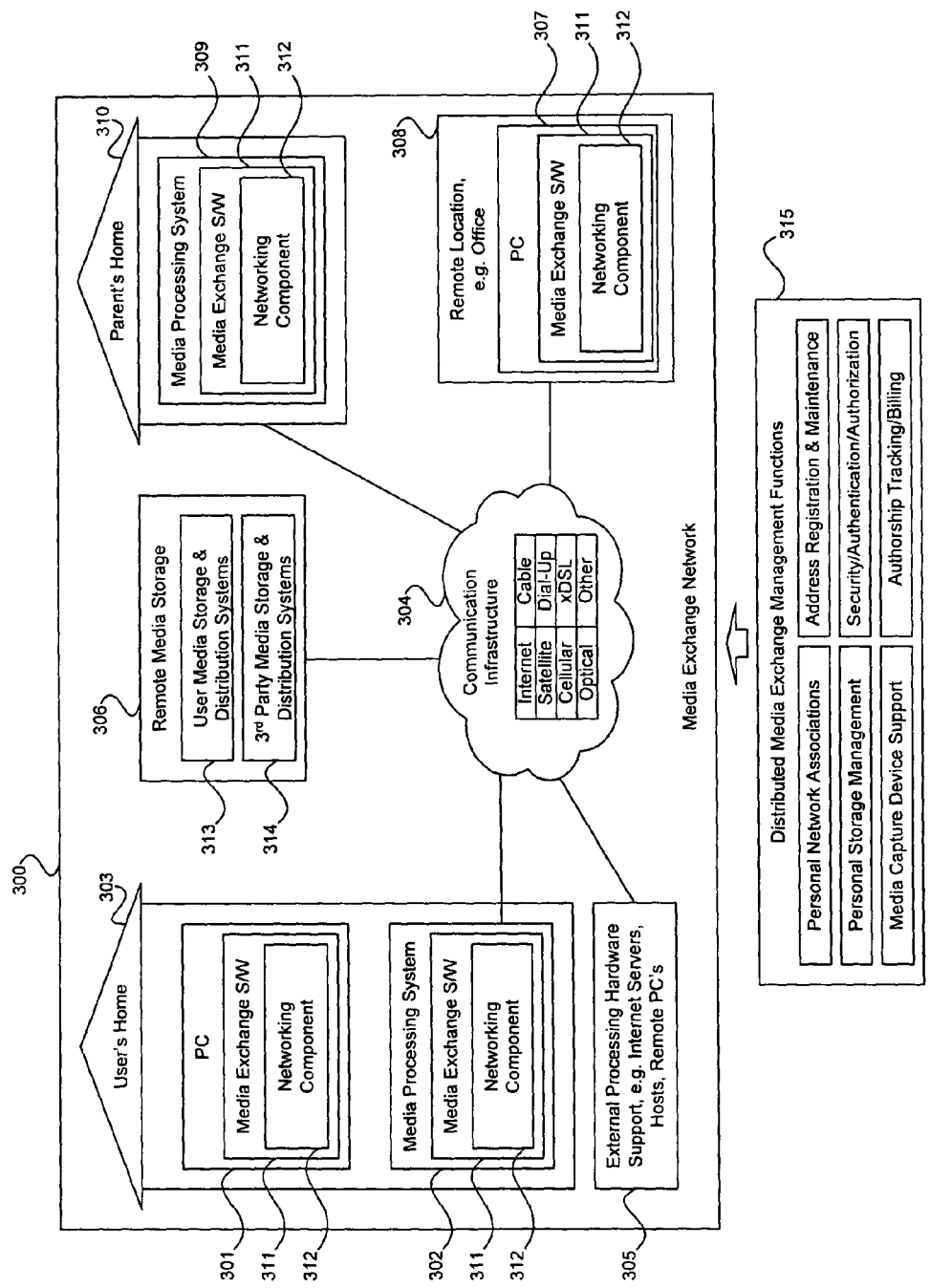
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface providing a TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
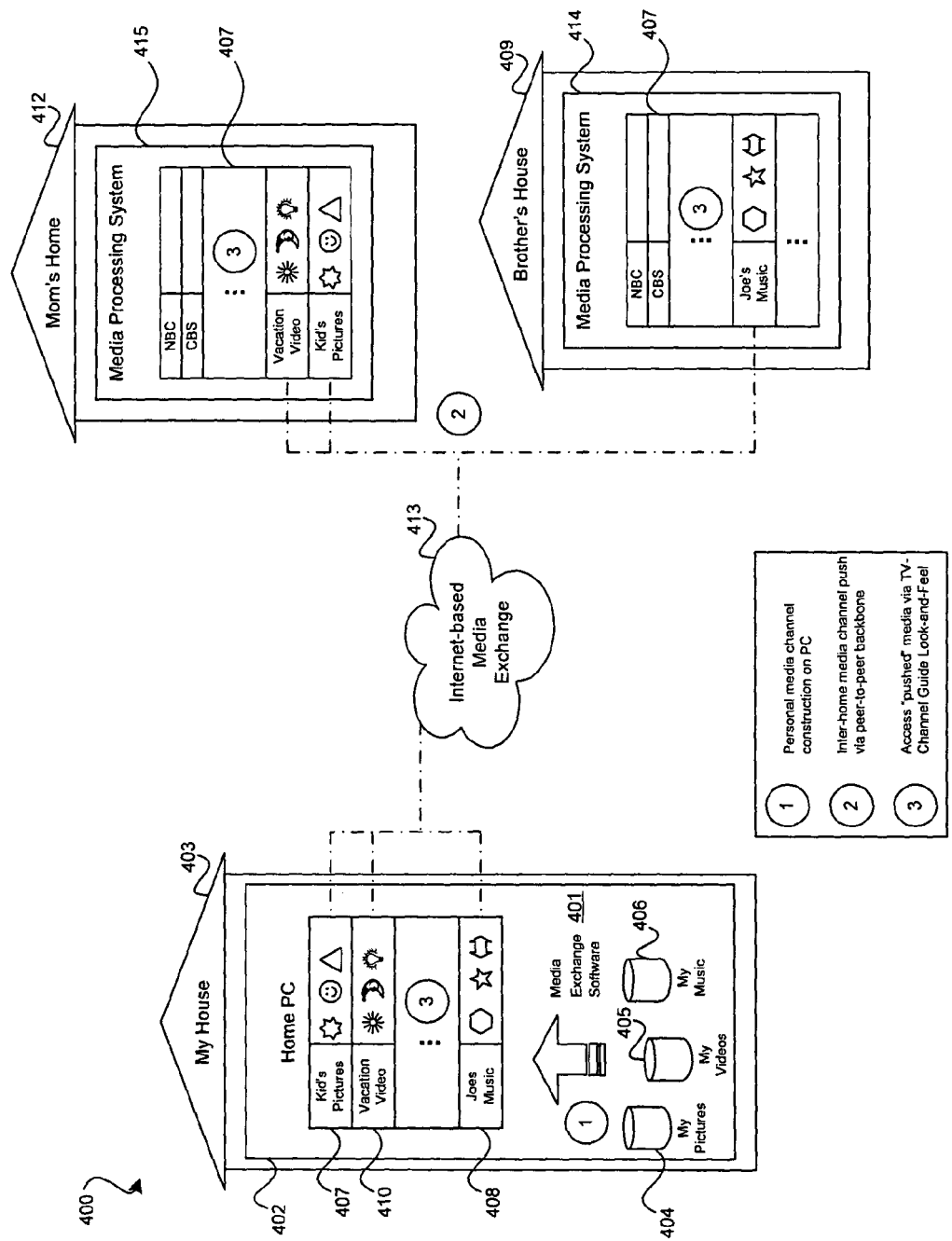
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a media guide user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a media guide user interface 407.

In step 3, brother and/or Mom access the pushed media channels via their respective media processing systems (MPS's) 414 and 415 using their respective MPS TV screens and remote controls.

Figure 5:
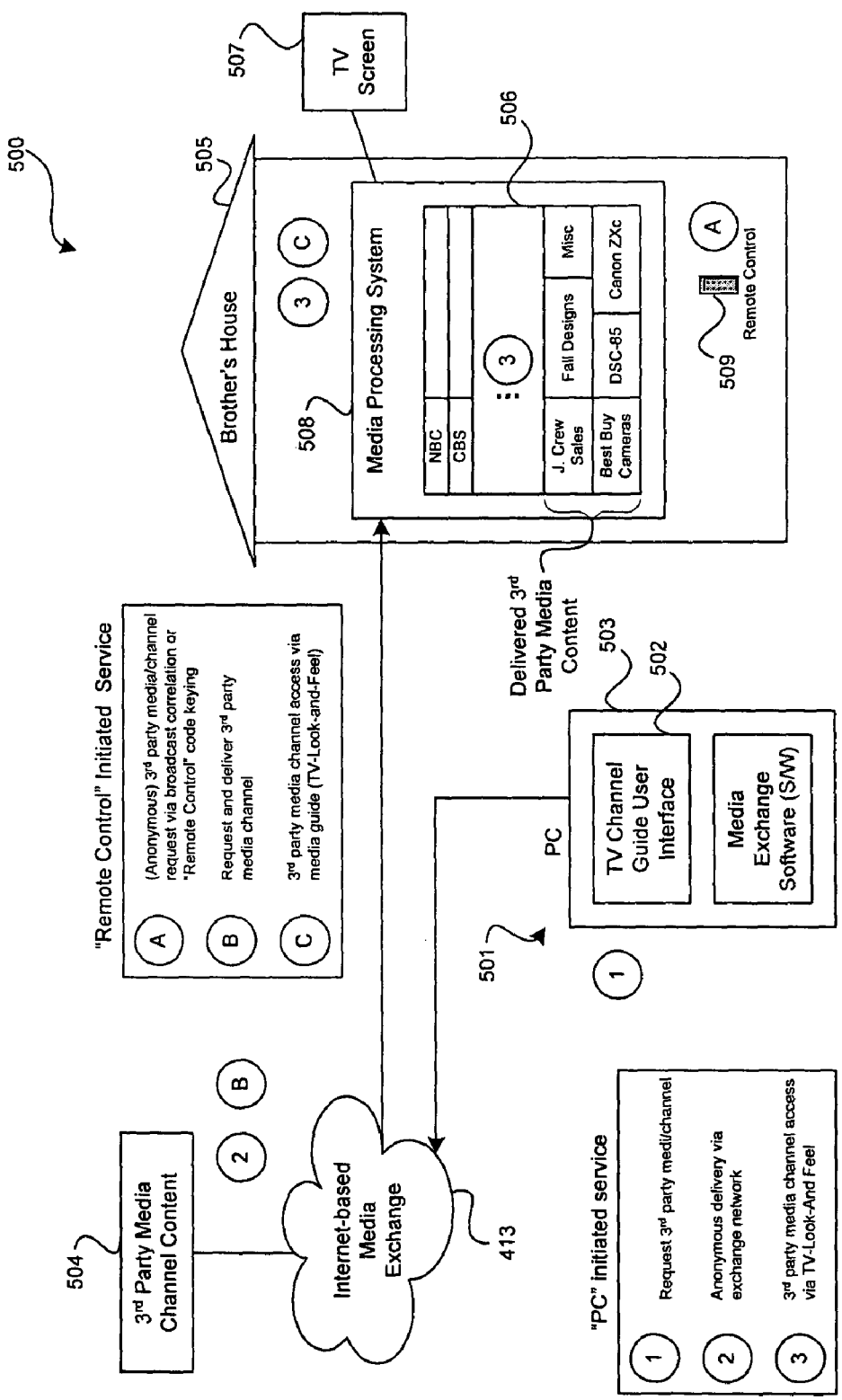
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a media guide user interface 502 on a PC 503. In step 2, an anonymous delivery of the requested third-party channel 504 is made to a second party 505 via the internet-based media exchange network 500. In step 3, the second party 505 accesses the third-party channel 504 using a media guide user interface 506 on a TV screen 507 that is integrated into an MPS 508.

Similarly, in step A, an MPS-initiated third-party request is made by a second party 505 via an internet-based media exchange network 500 using a media guide user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a media guide user interface 502 on a PC 503.

Figure 6:
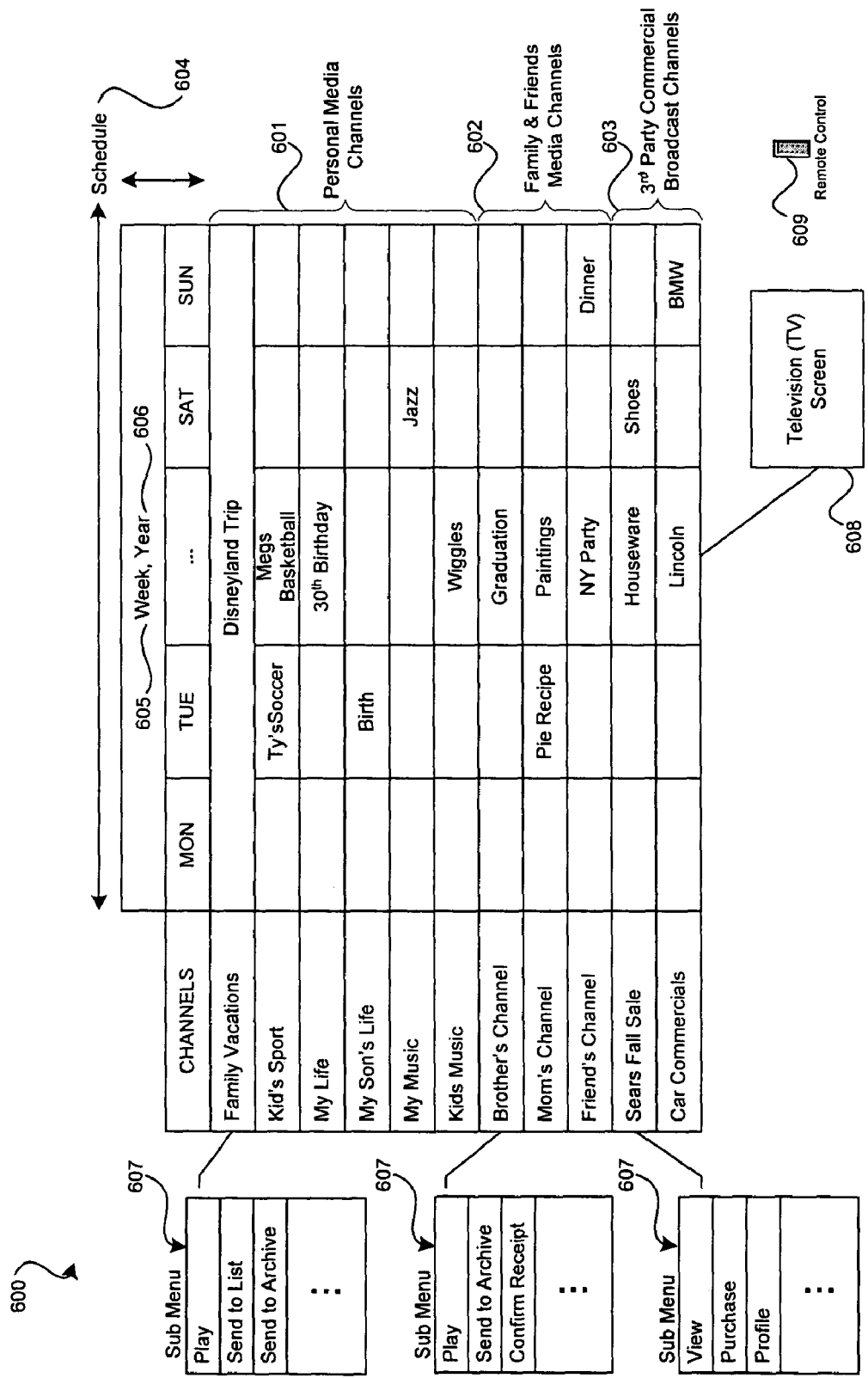
FIG. 6 is an exemplary illustration of a TV guide channel user interface in accordance with an embodiment of the present invention.

FIG. 6 illustrates a media guide user interface 600 in accordance with an embodiment of the present invention. The media guide user interface 600 may be displayed on a TV screen 608 and controlled by a remote control device 609. Also, the media guide user interface 600 may be displayed on a PC monitor and controlled by a keyboard or mouse.

The media guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
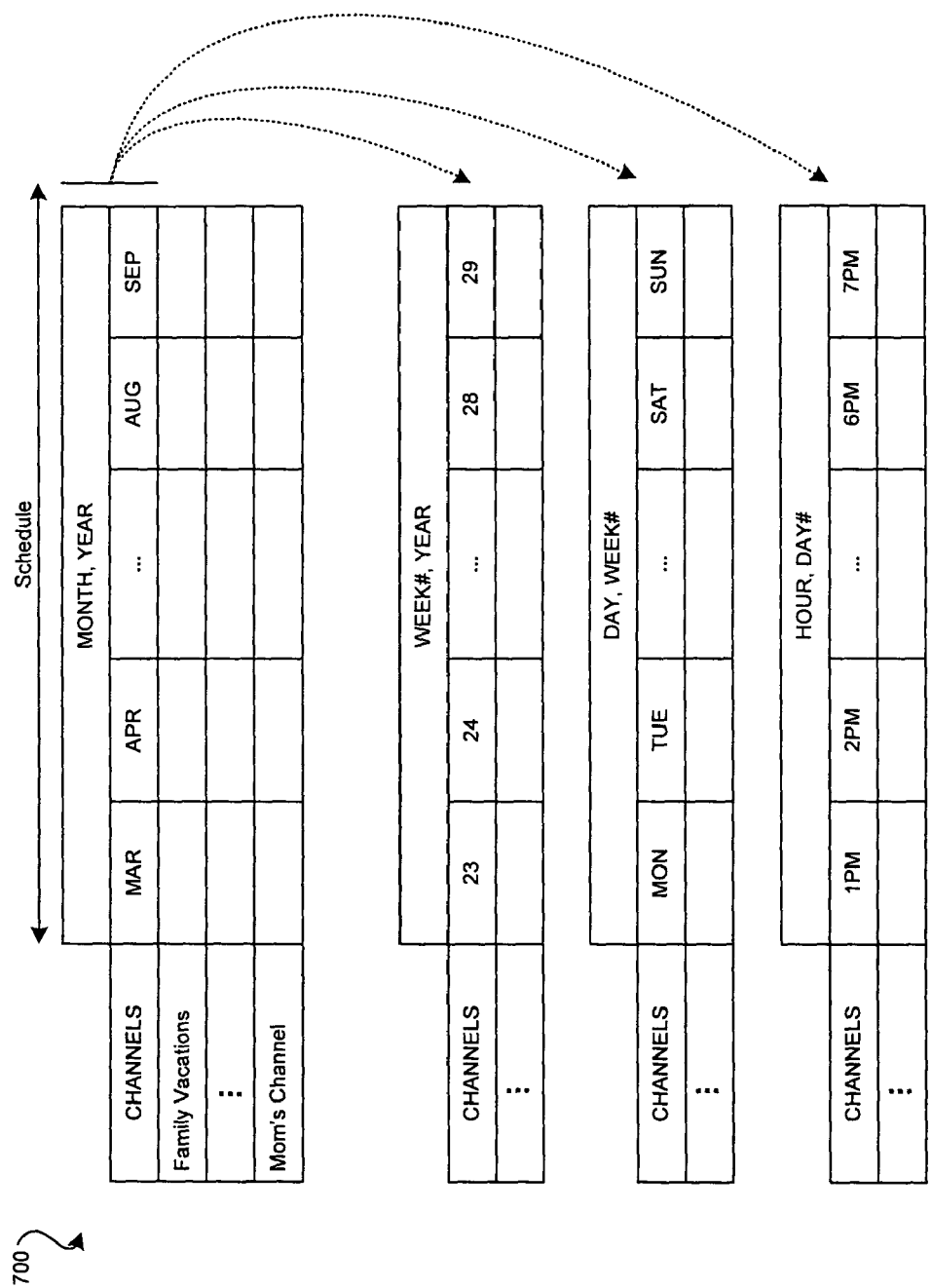
FIG. 7 is an exemplary illustration of several instantiations of a TV guide channel user interface of FIG. 4 in accordance with an embodiment of the present invention.

FIG. 7 illustrates possible multiple instantiations of a media guide user interface 700 in accordance with an embodiment of the present invention. The media guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The media guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
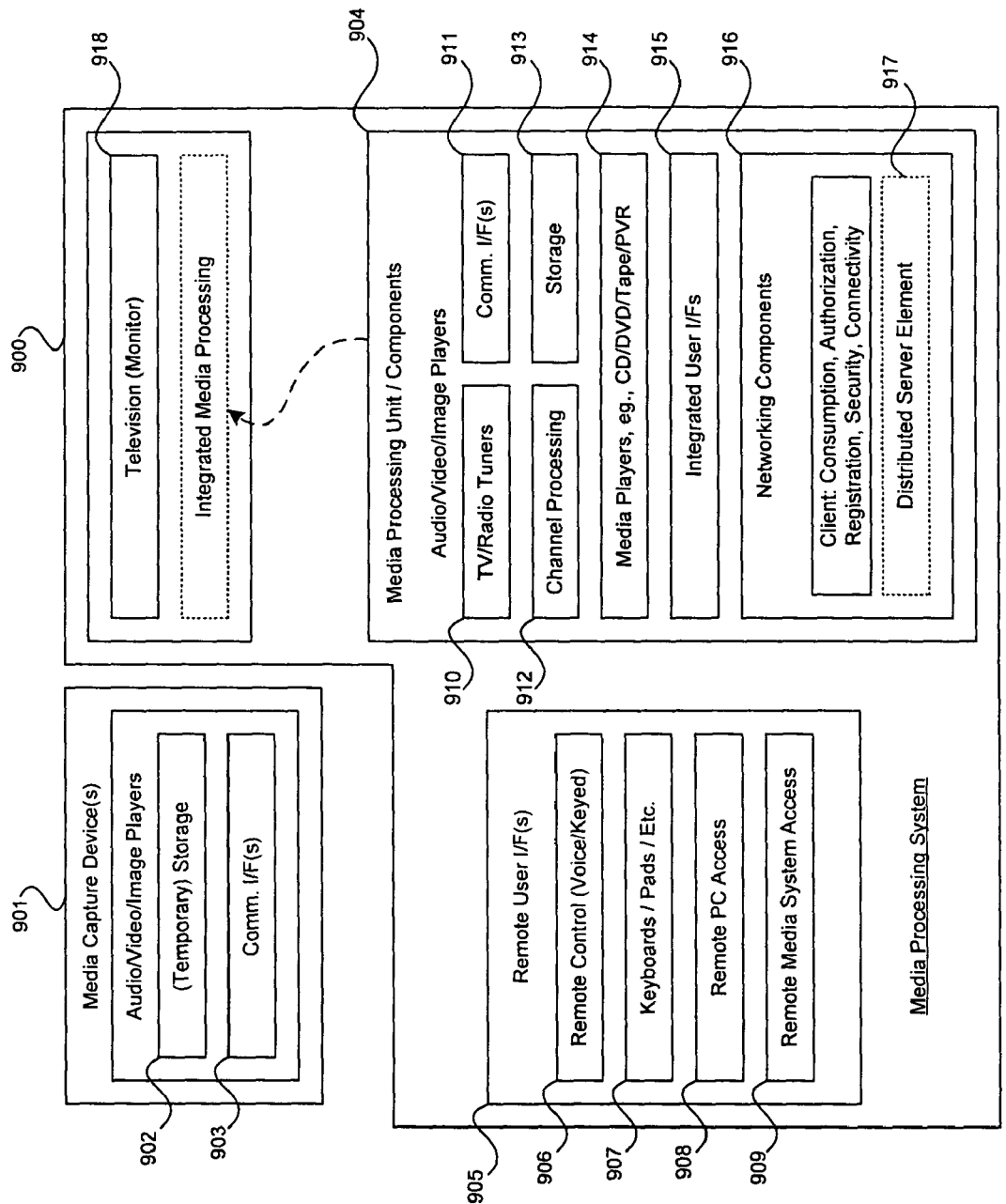
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
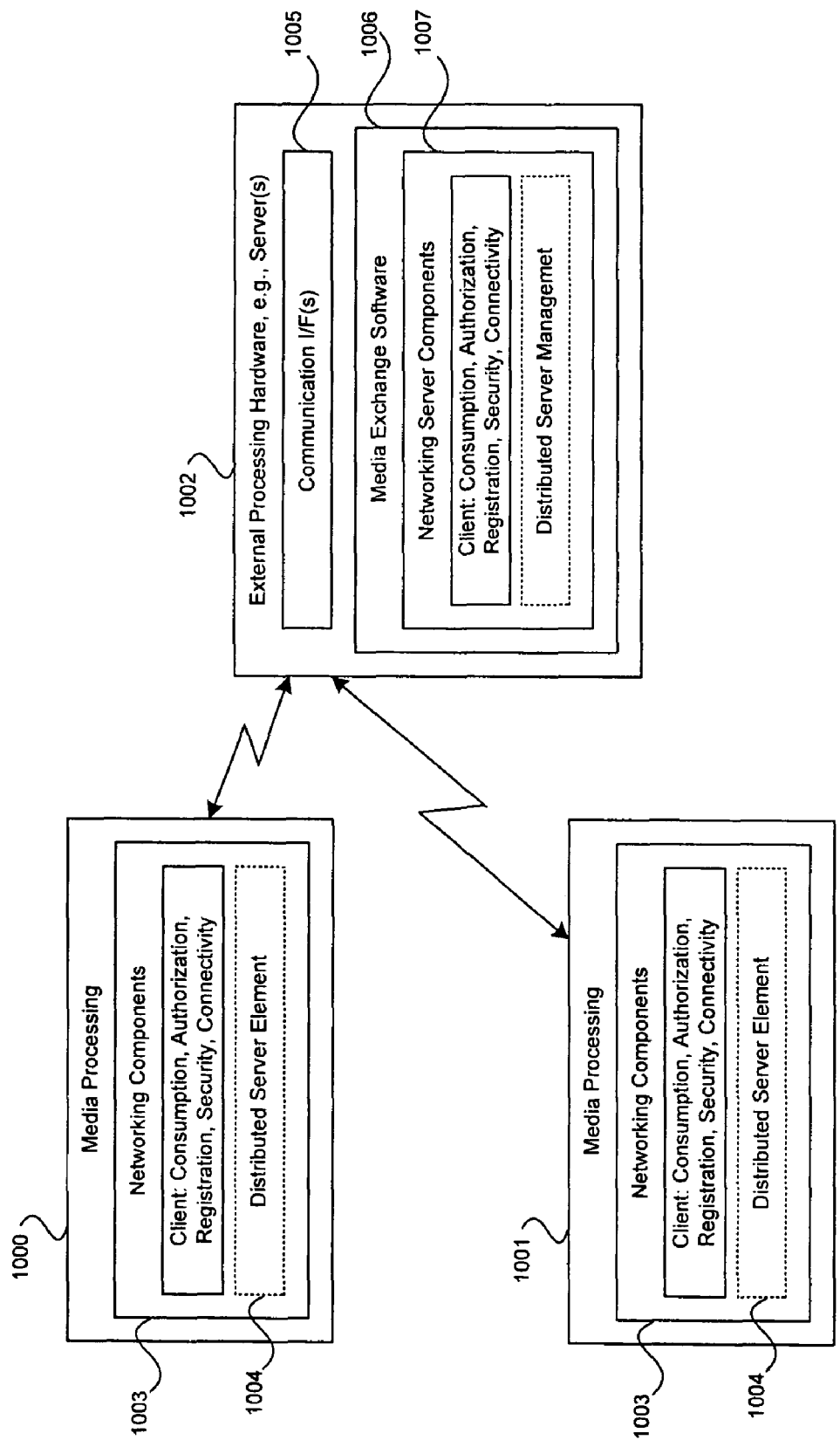
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
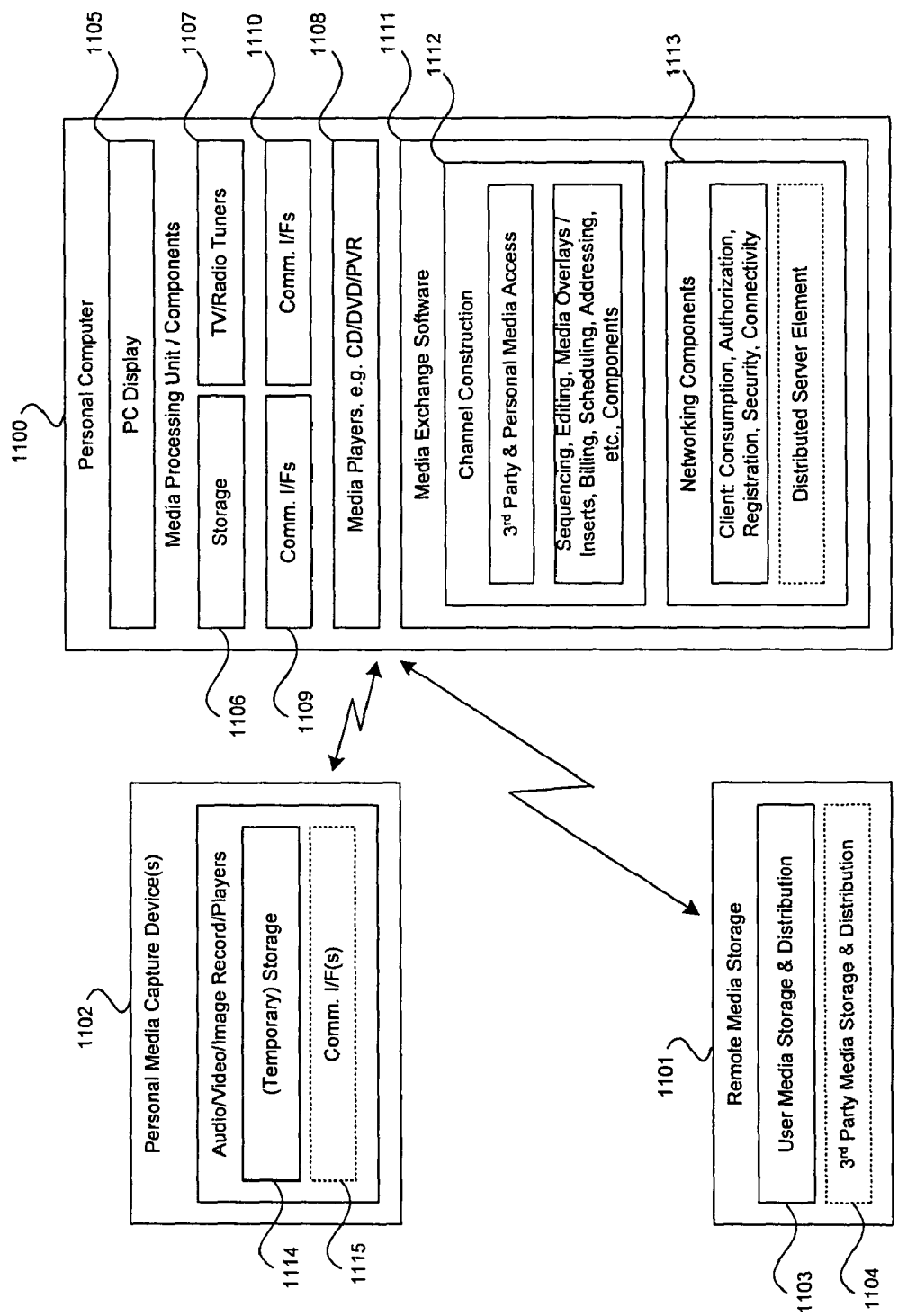
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9A. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

Another embodiment of the invention may provide a system for supporting a plurality of broadband networks and service provider infrastructures. Certain aspects of the system for supporting a plurality of broadband networks and service provider infrastructures may comprise at least one processor that executes a provisioning protocol, which establishes a second communication path that is independent of a first communication path that couples at least two end points via at least a first broadband network. The processor may be a media processing system processor, a media management system processor, a computer processor, a media exchange software processor and/or a media peripheral processor. Notwithstanding, the processor may be adapted to transfer information that would normally be transferred over the first communication path between at least two endpoints via the established second communication path and traversing the first broadband network. In accordance with an aspect of the invention, the processor may provision the established second communication path so that it may handle various communication functions. These communication functions may include, but are not limited to, operation administration maintenance and administration (OAM&P), roaming, user authentication, media transfer, caching, storage management and addressing management. Information transferred between the two endpoints via the established second communication path may be temporarily stored or cached by the processor.

The first communication path may be a physical communication path, while the second communication path may be a logical communication path comprising a circuit switched connection and/or a packet switched connection. The two endpoints may comprise a first source endpoint and at least a first destination endpoint. After the processor establishes a communication path between the first source endpoint and at least a first destination endpoint, the first source endpoint and at the first destination endpoint may communicate via the second communication channel. The communication occurs independent of the first communication path. The two endpoints may comprise media processing systems, media peripherals, personal computers, third ($3^{rd}$) party media providers, third ($3^{rd}$) party storage vendors and/or channel information servers. The second and the first communication paths may comprises a wired and/or a wireless communication link.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for supporting a plurality of broadband networks and various service provider infrastructures, the method comprising:

establishing a logical communication path that is independent of a physical communication path that couples at least two end points via at least a first broadband network, wherein each network connection on said physical communication path has a corresponding redundant network connection on said logical communication path, wherein at least a first portion of said logical communication path and at least a second portion of said logical communication path utilize different communication protocols and handle communication of different communication types, and wherein both of said physical and logical communication paths are established through the same plurality of network nodes; and transferring information that would be normally transferred over said physical communication path between said at least two endpoints, via said established logical communication path over said corresponding redundant network connection.

2. The method according to claim 1, comprising provisioning said established logical communication path for handling communication functions.

3. The method according to claim 2, wherein said communication functions comprise one or more of operations administration maintenance and provisioning (OAM&P), roaming, user authentication, media transfer, caching, storage management and/or addressing management.

4. The method according to claim 1, comprising temporarily storing said information during said transferring of said information between said at least two endpoints via said established logical communication path.

5. The method according to claim 1, wherein said logical communication path comprises one or both of a circuit switched connection and/or a packet switched connection.

6. The method according to claim 1, wherein said at least two endpoints comprise a first source endpoint and at least a first destination endpoint.

7. The method according to claim 1, wherein each of said at least two endpoints comprises one or more of a media processing system, a media peripheral, a personal computer, a third ($3^{rd}$) party media provider, a third ($3^{rd}$) party storage vendor and/or a channel information server.

8. The method according to claim 1, wherein each of said logical and said physical communication paths comprises one or both of a wired and/or a wireless communication link.

9. A non-transitory computer-readable medium having stored thereon, a computer program having at least one code section for supporting a plurality of broadband networks and various service provider infrastructures, the at least one code section being executable by a computer for causing the computer to perform steps comprising:

establishing a logical communication path that is independent of a physical communication path that couples at least two end points via at least a first broadband network, wherein each network connection on said physical communication path has a corresponding redundant network connection on said logical communication path, wherein at least a first portion of said logical communication path and at least a second portion of said logical communication path utilize different communication protocols and handle communication of different communication types, and wherein both of said physical and logical communication paths are established through the same plurality of network nodes; and transferring information that would be normally transferred over said physical communication path between said at least two endpoints, via said established logical communication path over said corresponding redundant network connection.

10. The non-transitory computer-readable medium according to claim 9, comprising code for provisioning said established logical communication path for handling communication functions.

11. The non-transitory computer-readable medium according to claim 10, wherein said communication functions comprise one or more of operations administration maintenance and provisioning (OAM&P), roaming, user authentication, media transfer, caching, storage management and/or addressing management.

12. The non-transitory computer-readable medium according to claim 9, comprising code for temporarily storing said information during said transferring of said information between said at least two endpoints via said established logical communication path.

13. The non-transitory computer-readable medium according to claim 9, wherein said second communication path comprises one or both of a circuit switched connection and/or a packet switched connection.

14. The non-transitory computer-readable medium according to claim 9, wherein said at least two endpoints comprise a first source endpoint and at least a first destination endpoint.

15. The non-transitory computer-readable medium according to claim 9, wherein each of said at least two endpoints comprises one or more of a media processing system, a media peripheral, a personal computer, a third ($3^{rd}$) party media provider, a third ($3^{rd}$) party storage vendor and/or a channel information server.

16. The non-transitory computer-readable medium according to claim 9, wherein each of said logical and said physical communication paths comprises one or both of a wired and/or a wireless communication link.

17. A system for supporting a plurality of broadband networks and various service provider infrastructures, the system comprising:

at least one processor executing a provisioning protocol that establishes a logical communication path that is independent of a physical communication path that couples at least two end points via at least a first broadband network, wherein each network connection on said physical communication path has a corresponding redundant network connection on said logical communication path, wherein at least a first portion of said logical communication path and at least a second portion of said logical communication path utilize different communication protocols and handle communication of different communication types, and wherein both of said physical and logical communication paths are established through the same plurality of network nodes; and said at least one processor transfers information that would normally be transferred over said physical communication path between said at least two endpoints, via said established logical communication path over said corresponding redundant network connection.

18. The system according to claim 17, said at least one processor provisions said established logical communication path for handling communication functions.

19. The system according to claim 18, wherein said communication functions comprise one or more of operations administration maintenance and provisioning (OAM&P), roaming, user authentication, media transfer, caching, storage management and/or addressing management.

20. The system according to claim 17, wherein said at least one processor temporarily stores said information during said transferring of said information between said at least two endpoints via said established logical communication path.

21. The system according to claim 17, wherein said logical communication path comprises one or both of a circuit switched connection and/or a packet switched connection.

22. The system according to claim 17, wherein said at least two endpoints comprise a first source endpoint and at least a first destination endpoint.

23. The system according to claim 17, wherein each of said at least two endpoints comprises one or more of a media processing system, a media peripheral, a personal computer, a third ($3^{rd}$) party media provider, a third ($3^{rd}$) party storage vendor and/or a channel information server.

24. The system according to claim 17, wherein each of said logical and said physical communication paths comprises one or both of a wired and/or a wireless communication link.

25. The system according to claim 17, wherein said at least one processor comprises one or more of a media processing system processor, a media management system processor, a computer processor, a media exchange software processor and/or a media peripheral processor.

* * * * *